United States Patent
Kamio et al.

(10) Patent No.: US 7,190,138 B2
(45) Date of Patent: Mar. 13, 2007

(54) FAILURE MONITOR FOR MOTOR DRIVE CONTROL SYSTEM

(75) Inventors: Shigeru Kamio, Nagoya (JP); Yasuhiro Nakai, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/018,918

(22) Filed: Dec. 22, 2004

(65) Prior Publication Data

US 2005/0156550 A1    Jul. 21, 2005

(30) Foreign Application Priority Data

Dec. 22, 2003    (JP)    ............... 2003-425925

(51) Int. Cl.
*H02H 7/08*    (2006.01)

(52) U.S. Cl. .............. 318/445; 318/563; 318/721; 318/652; 318/823; 701/41; 701/43

(58) Field of Classification Search ............ 318/445, 318/563, 3
See application file for complete search history.

(56) References Cited

U.S. PATENT DOCUMENTS

| | | | | |
|---|---|---|---|---|
| 4,714,005 A | * | 12/1987 | Leemhuis | 91/361 |
| 4,782,907 A | * | 11/1988 | Morishita et al. | 180/412 |
| 5,172,784 A | * | 12/1992 | Varela, Jr. | 180/65.4 |
| 5,506,776 A | * | 4/1996 | Fushimi et al. | 701/41 |
| 6,218,799 B1 | * | 4/2001 | Hori | 318/446 |
| 6,499,371 B2 | * | 12/2002 | Tsuzuki et al. | 74/335 |
| 6,550,559 B1 | * | 4/2003 | Amatangelo et al. | 180/233 |
| 6,695,747 B2 | * | 2/2004 | Zimmermann et al. | 477/123 |
| 6,722,219 B2 | * | 4/2004 | Berger et al. | 74/335 |
| 6,791,219 B1 | * | 9/2004 | Eric et al. | 310/68 B |
| 6,845,309 B2 | * | 1/2005 | Recker et al. | 701/41 |
| 6,865,463 B2 | * | 3/2005 | Suzuki | 701/43 |
| 6,923,696 B2 | * | 8/2005 | Okuyama | 440/85 |
| 2002/0108457 A1 | * | 8/2002 | Berger et al. | 74/335 |
| 2004/0008002 A1 | | 1/2004 | Kamio et al. | |

FOREIGN PATENT DOCUMENTS

| | | |
|---|---|---|
| JP | 2002-323127 | 11/2002 |
| JP | 2004-48837 | 2/2004 |
| JP | 2004-56855 | 2/2004 |
| JP | 2004-56856 | 2/2004 |

\* cited by examiner

*Primary Examiner*—Lincoln Donovan
*Assistant Examiner*—Renata McCloud
(74) *Attorney, Agent, or Firm*—Nixon & Vanderhye P.C.

(57) ABSTRACT

A failure monitor designed to monitor a failure in operation of a motor drive control system. The system works to drive a motor-driven member through an output shaft and an electric motor and includes an output shaft angular position sensor for determining an angular position of the output shaft and an encoder for determining an angular position of the motor for use in controlling the motor. The system works to discriminate among failures in operation of the output shaft angular position sensor and the encoder and another type of a failure using outputs of the sensors.

8 Claims, 6 Drawing Sheets

FAILURE MONITOR FOR MOTOR DRIVE CONTROL SYSTEM

CROSS REFERENCE TO RELATED DOCUMENT

The present application claims the benefit of Japanese Patent Application No. 2003-425925 filed on Dec. 22, 2003, the disclosure of which is incorporated herein by reference.

BACKGROUND OF THE INVENTION

1. Technical Field of the Invention

The present invention relates generally to a failure monitor for a motor drive control system which controls rotation of a motor working to output torque to a motor-driven member through a torque transmitting mechanism and an output shaft joined to the motor-driven member.

2. Background Art

In recent years, in order to meet space saving requirements, facilitating ease of assembly, or improving controllability of automotive vehicles, there have been increased trends toward use of an electrical system working to drive a controlled mechanism through an electric motor. For example, Japanese Patent First Publication No. 2002-323127 discloses an automatic transmission control system designed to actuate a range shift mechanism for automotive automatic transmissions using an electric motor. A selection of gear ranges of the automatic transmission is achieved by actuating the range shift mechanism using a drive shaft joined to an output shaft of the motor through a speed reducing mechanism. The motor has installed thereon an encoder working to measure an angular position of the output shaft of the motor. The system uses an output of the encoder to rotate the motor to bring the angular position thereof into agreement with a target one (i.e., a target count value of the encoder), thereby establishing a selected one of the gear ranges of the automatic transmission through the range shift mechanism.

The rotation of the motor is converted into that of the drive shaft (i.e., a manipulated variable of the range shift mechanism) through the speed reducing mechanism. A speed reducing mechanism of this type is typically made of a gear train in which there is inevitably some play or looseness between gears. In a case where the speed reducing mechanism is joined to the drive shaft through fitting of a D-shaped connector formed on the tip of an axis thereof into a mating recess formed in the drive shaft, some clearance is required to facilitate ease of such fitting, which will, however, result in an error in the amount by which the output shaft is rotated by the motor even if the motor is controlled accurately by monitoring the output of the encoder as representing the angular position of the motor, thus leading to a difficulty in controlling the manipulated variable of the range shift mechanism correctly.

In order to compensate for the error in the amount by which the output shaft is rotated, an output shaft angular position sensor may also be used to measure the angular position of the output shaft for controlling the motor to bring the angular position of the output shaft into agreement with a target one under feedback control.

However, if an error in the output of the output shaft angular position sensor arises from some failure in operation thereof, it will result in an error in controlling the manipulated variable of the range shift mechanism. This may cause the automatic transmission to be shifted to an erroneous one of the gear ranges through the range shift mechanism or disenable the range shift mechanism to change the gear of the automatic transmission and result in a difficulty in monitoring a malfunction of the feedback control system.

If the encoder working to measure the angular position of the motor has failed, it will result in a difficulty in rotating the motor to the target angular position (i.e., the target count value of the encoder). This may cause the automatic transmission to be shifted to an erroneous one of the gear ranges through the range shift mechanism or disenable the range shift mechanism to change the gear of the automatic transmission.

If the output shaft angular position sensor and the encoder are operating normally, but the rotary system has undergone an excessive increase in rotational resistance therein or a mechanical lock, it also results in a difficulty in rotating the motor correctly, thus causing the range shift mechanism to be shifted to an incorrect gear range or disenabled.

SUMMARY OF THE INVENTION

It is therefore a principal object of the invention to avoid the disadvantages of the prior art.

It is another object of the invention to provide a failure monitor designed to discriminate among failures in operation of a motor angular position sensor and an output shaft angular position sensor, as used in a motor drive control system of the type as described above, and another type of failure.

According to one aspect of the invention, there is provided a motor drive control system failure monitoring apparatus designed to monitor a failure in operation of a motor drive control system. The motor drive control system works to control rotation of a motor working to output torque to a motor-driven member through a torque transmitting mechanism and an output shaft joined to the motor-driven member and includes a motor angular position sensor working to produce an output as a function of an angular position of the motor for use in controlling rotation of the motor to bring the angular position of the motor into agreement with a target one and an output shaft angular position sensor working to produce an output as a function of an angular position of the output shaft. The motor drive control system failure monitoring apparatus comprises: (a) a first comparing circuit working to compare one of the output of the motor angular position sensor and a change in the output of the motor angular position sensor with one of the output of the output shaft angular position sensor and a change in the output of the output shaft angular position sensor; (b) a second comparing circuit working to compare the output of the motor angular position sensor with the target angular position when the motor is at rest; and (c) a failure diagnosing circuit working to discriminate among failures in operation of the motor angular position sensor and the output shaft angular position sensor and another type of failure using results of the comparisons as made by the first and second comparing circuits.

Specifically, the first comparing circuit may be designed to determine whether the one of the output of the motor angular position sensor and the change thereof matches the one of the output of the output shaft angular position sensor and the change thereof within a permissible range which includes an error arising from the play of the torque transmission mechanism or not. If they mismatch each other, there is a possibility that either one of the motor angular position sensor and the output shaft angular position sensor is failing.

The second comparing circuit may be designed to determine whether the output of the motor angular position sensor matches the target angular position when the motor is at rest or not. If they match each other, there is a possibility that the motor angular position sensor or the motor itself is disenabled due to a mechanical lock.

Therefore, using a combination of the above determinations, the failure diagnosing circuit may discriminate among the failures in operation of the motor angular position sensor and the output shaft angular position sensor and the another type of failure.

In the preferred mode of the invention, when the result of comparison made by the first comparing circuit shows that the one of the output of the motor angular position sensor and the change thereof mismatches the one of the output of the output shaft angular position sensor and the change thereof, the failure diagnosing circuit discriminates between the failures in operation of the motor angular position sensor and the output shaft angular position sensor based on whether the result of comparison made by the second comparing circuit shows a match between the output of the motor angular position sensor and the target angular position or not. When the result of comparison made by the first comparing circuit shows that the one of the output of the motor angular position sensor and the change thereof matches the one of the output of the output shaft angular position sensor and the change thereof, the failure diagnosing circuit discriminates between the failures in operation of the motor angular position sensor and the output shaft angular position sensor based on whether the result of comparison made by the second comparing circuit shows a mismatch between the output of the motor angular position sensor and the target angular position or not.

When it is determined that the output shaft angular position sensor is failing, the failure diagnosing circuit may store failure information indicating thereof in a storage device, perform a given warning operation, and control the motor to bring the angular position thereof into agreement with the target one using the output of the motor angular position sensor in a feedback control mode. When it is determined that the motor angular position sensor is failing, the failure diagnosing circuit may store failure information indicating thereof in the storage device, perform a given warning operation, and switch control of the motor from the feedback control mode to open-loop control mode. When it is determined that the another type of failure is occurring, the failure diagnosing circuit may store failure information indicating thereof in the storage device, perform a given warning operation, and stop driving the motor.

The motor-driven member may be a range shift mechanism working to shift one of gear ranges of an automotive automatic transmission to a selected one.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
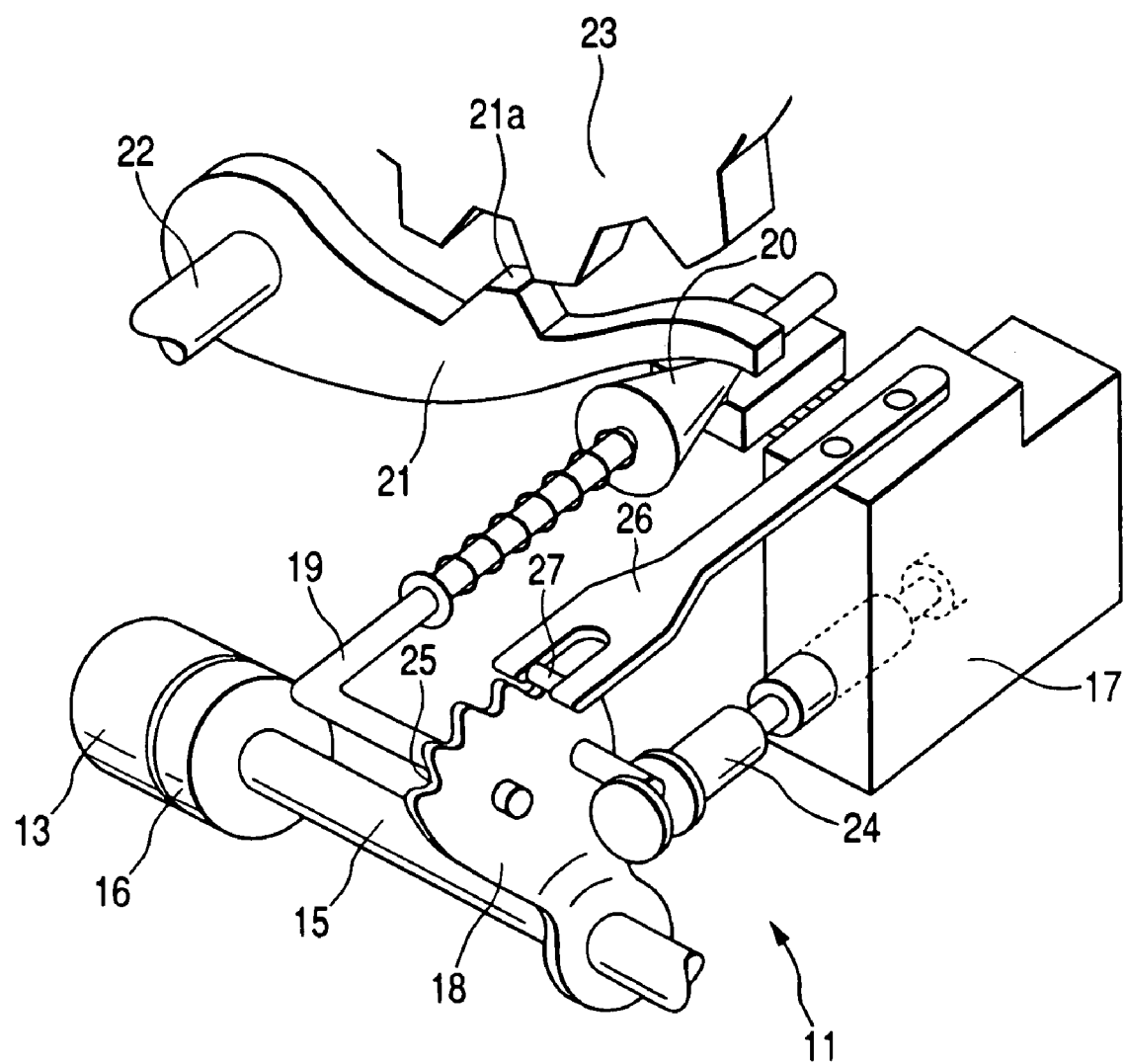
FIG. 1 is a perspective view which shows a motor drive control system failure monitoring system according to the first embodiment of the invention.
Figure 2:
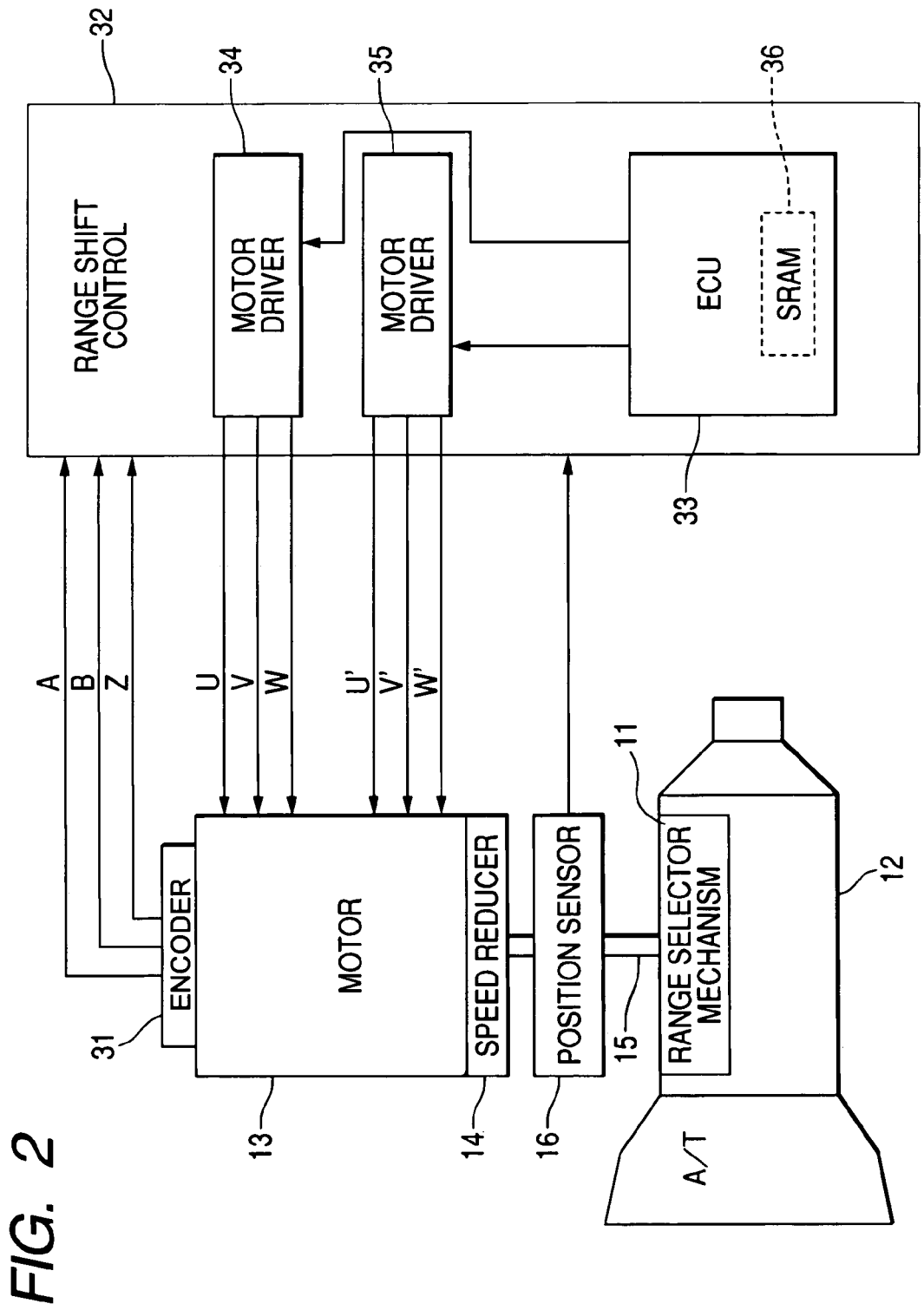
FIG. 2 is a block diagram which shows a circuit structure of the motor drive control system failure, as illustrated in FIG. 1.
Figure 3:
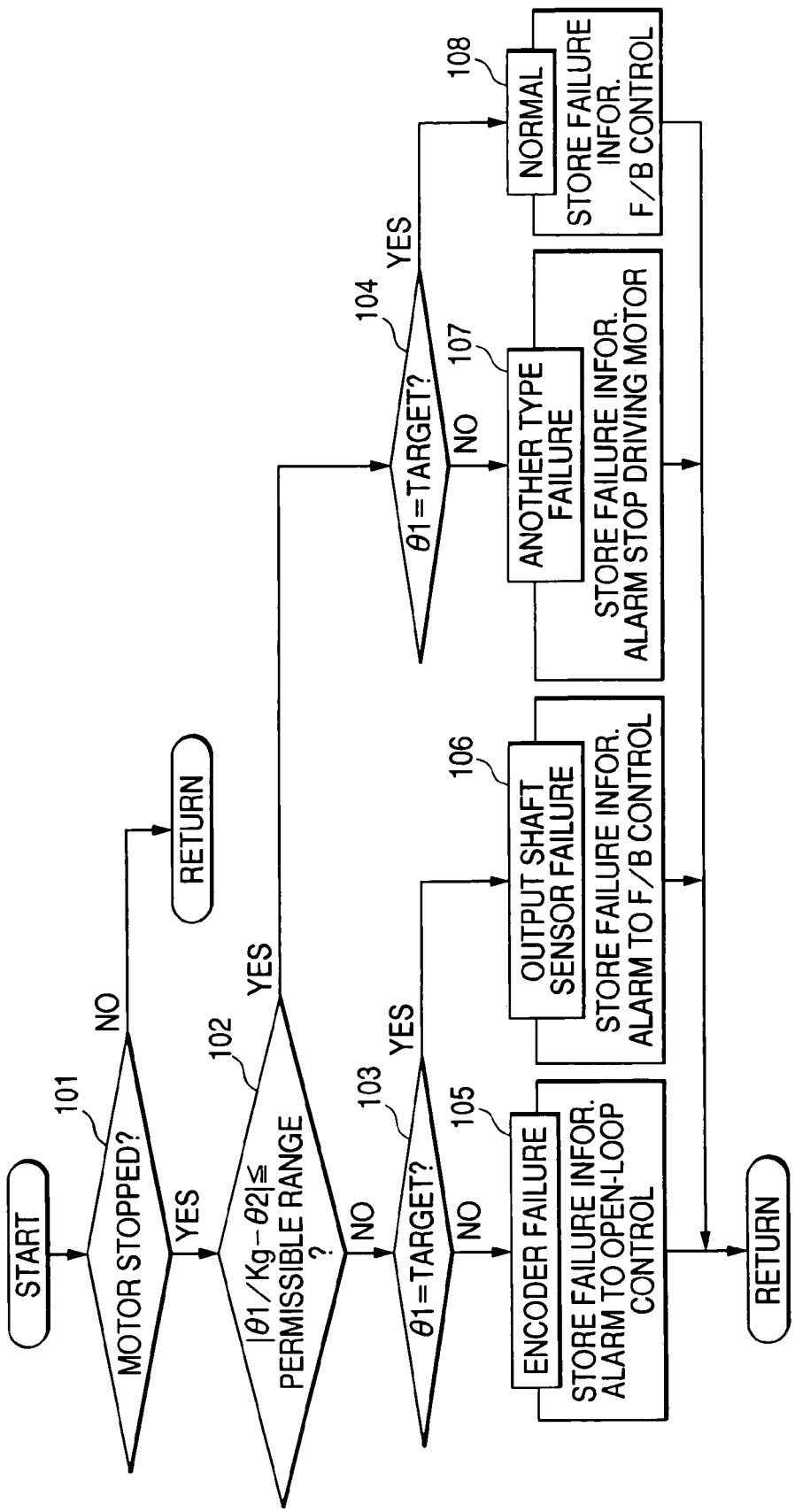
FIG. 3 is a flowchart of a program executed by an electronic control unit (ECU) of the motor drive control system failure monitoring system of FIG. 2.

Referring to the drawings, wherein like reference numbers refer to like parts in several views, particularly to FIGS. 1, 2, and 3, there is shown a motor drive control system failure monitoring apparatus according to the first embodiment of the invention which is used, as an example, to monitor a failure in operation of a motor drive system for a range shift mechanism 11 working to change the gear of an automatic transmission 12 for automotive vehicles.

The automatic transmission 12, as referred to therein, has a typical structure which is designed to be switchable in operation between four gear ranges: a parking (P) range, a reverse (R) range, a neutral (N) range, and a drive (D) range. The range shift mechanism 11 works to shift the P, R, N, and D ranges of the automatic transmission 12 from one to another. The range shift mechanism 11 is driven by an electric motor 13. The motor 13 is made of a synchronous motor such as a switched reluctance motor (SRM) and has a speed reducing mechanism 14 installed therein, as shown in FIG. 2. The speed reducing mechanism 14 has an output shaft joined to the range shift mechanism 11 through an output shaft 15. The motor 13 also includes an output shaft sensor 16 which measures an angular position thereof and outputs a signal indicative thereof.

The output shaft 15, as clearly shown in FIG. 1, has secured thereon a detent lever 18 which works to change a valve position of a manual valve 17 disposed in a hydraulic circuit of the automatic transmission 12. The detect lever 18 has jointed thereto an L-shaped parking rod 19 which has a conical head 20 in abutment with a lock lever 21. The lock lever 21 is shifted vertically, as viewed in the drawing, around a support shaft 22 as the conical head 20 is moved by a shifting motion of the parking rod 19, thereby locking or unlocking a parking gear 23. The parking gear 23 is joined to an output shaft of the automatic transmission 12. When the parking gear 23 is locked from rotating by the lock lever 21, it will cause driven wheels of the automotive vehicle to be placed in parking mode.

The detent lever 18 has jointed thereto a spool valve 24 of the manual valve 17 through a pin. When the detent lever 18 is rotated by the motor 13 through the output shaft 15, it shifts the position of the spool valve 24 of the manual valve 17, thereby changing one of the P, R, N, and D ranges to another. The detent lever 18 has a waved end wall in which four recesses 25 are formed. The recesses 25 serve to hold the spool valve 24 at any one of four positions corresponding to the P, R, N, and D ranges of the automatic transmission 12, respectively.

A detent spring 26 is firmly fixed on the manual valve 17. The detent spring 26 has affixed to the tip thereof a pin 27 which engages a selected one of the recesses 25 of the detent lever 18 to hold the detent lever 18 at a corresponding one of four angular positions thereof, thereby holding the spool valve 24 of the manual valve 17 at the position corresponding to a selected or target one of the P, R, N, and D ranges of the automatic transmission 12.

When it is required to establish the P range, the parking rod 19 is moved to the lock lever 21 and then lifts it up at a large-diameter portion of the conical head 20 to bring a protrusion 21a of the lock lever 21 into engagement with one of gear teeth of the parking gear 23 so that the parking gear 23 is locked. This causes the output shaft (i.e., a driving shaft) of the automatic transmission 12 to be locked and placed in the parking mode.

Alternatively, when it is required to establish the gear range other than P range, the parking rod 19 is moved away from the lock lever 21 to bring the large-diameter portion of the conical head 20 into disengagement from the protrusion 21a of the lock lever 21, so that the protrusion 21a leaves one of gear teeth of the parking gear 23. This causes the output shaft of the automatic transmission 12 to be unlocked and allowed to rotate to ensure the running of the vehicle.

The output shaft sensor 16 is implemented by an angular position sensor such as a potentionmeter which works to produce an output voltage as a function of an angular position of the output shaft 15 of the speed reducing mechanism 14 of the motor 13. The output voltage is used to determine to which of the P, R, N, and D ranges the automatic transmission 12 is to be shifted.

The motor 13 has also installed thereon an encoder 31 working as an angular position sensor to measure an angular position of a rotor of the motor 13. The encoder 31 is implemented by, for example, a magnetic rotary encoder which is designed to output one of A-, B-, and Z-phase pulse signals in synchronization with rotation of the rotor of the motor 13 to a range selection control unit 32. The range selection control unit 32 includes motor drivers 34 and 35, and an electronic control unit (ECU) 33. The ECU 33, as will be described later in detail, serves as a system failure monitor. The ECU 33 counts both a leading and a trailing edge (also called a rising and a falling edge) of each of the A- and B-phase signals and uses such a count value (will also be referred to as an encoder count value below) to change among phases of the motor 13 in a scheduled sequence to energize the motor 13 through the motor drivers 34 and 35, thereby achieving rotation of the motor 13.

The ECU 33 samples an input sequence of the A- and B-phase signals to determine a rotational direction of the rotor of the motor 13 and increments the encoder count value when the motor 13 is rotating in a normal direction in which the gear range of the automatic transmission 12 is shifted from the P to D range or decrements the encoder count value when the motor 13 is rotating in a reverse direction in which the gear range of the automatic transmission 12 is shifted from the D to P range. This establishes a matching between the encoder count value and the angular position of the motor 13 regardless of the rotational direction of the motor 13. The ECU 33 also samples the encoder count value to determine the angular position of the motor 13 and energizes a winding of one of the phases of the motor 13 corresponding to the determined angular position to activate the motor 13. Note that the Z-phase signal outputted by the encoder 31 is used in the ECU 33 to detect a reference angular position of the rotor of the motor 13.

When a vehicle operator has shifted a gear shift lever to one of a parking (P), a reverse (R), a neutral (N), and a drive (D) position which correspond to the P, R, N, and D ranges of the automatic transmission 12, respectively, the ECU 33 determines a target angular position of the motor 13 (i.e., a target value of the encoder count value) and starts to electrically energize or rotate the motor 13 under feedback control until the encoder count value reaches the target one. Additionally, the ECU 33 samples the output voltage of the output shaft sensor 16 to monitor an instantaneous angular position of the output shaft 15 (i.e., the amount by which the spool valve 24 of the manual valve 17 has been moved) and determine in or to which of the P, R, N, and D ranges the automatic transmission 12 is placed or being shifted currently, thereby deciding whether a transmission gear change between the P, R, N, and D ranges has been completed correctly or not. The ECU 33 may also work to correct the target angular position of the motor 13 using the output voltage of the output shaft sensor 16 so as to compensate for a difference or error in angular position between the motor 13 and the output shaft 16 which usually arises from an inevitable play of the gear train.

If the system has failed, resulting in an error in the voltage output of the output shaft sensor 16, it will cause the ECU 30 to determine in error the angular position of the output shaft 15 (i.e., the amount by which the spool valve 24 of the manual valve 17 has been moved), so that the gear range of the automatic transmission 12 is selected incorrectly. This may cause the automatic transmission 12 to be shifted in error to an unselected one of the P, R, N, and D ranges or result in a difficulty in changing the gear of the automatic transmission 12 or detecting the failure in operation of the feedback control for the motor 13.

Additionally, if the encoder 31 working to measure the angular position of the motor 13 has failed, so that an error count value is outputted, it will result in a difficulty in rotating the motor 13 to a selected angular position (i.e., a target count value in the encoder 31). This may cause the range shift mechanism 11 to be shifted to an incorrect gear range or disenabled.

If the encoder 13 is operating normally, but the rotary system has undergone an excessive increase in rotational resistance therein or a mechanical lock, it also results in a difficulty in rotating the motor 13 correctly, thus causing the range shift mechanism 11 to be shifted to an incorrect gear range or disenabled.

In order to avoid the above drawbacks, the ECU 33 performs an output shaft sensor failure monitoring program, as shown in FIG. 3 to discriminate between the failures in operation of the encoder 31 and the output shaft sensor 16.

In brief, a comparison between a motor angular position $\theta 1$ that is the angular position of the motor 13, as determined using the count value of the encoder 31, and an output shaft angular position $\theta 2$ that is the angular position of the output shaft 16, as determined using the output of the output shaft sensor 16 is first made to determine whether a difference therebetween falls within a permissible range or not which is equivalent to an error arising from the play in the torque transmission mechanism between the motor 13 and the range shift mechanism 11. If the difference is out of the permissible range, it may be determined that there is a possibility that determines either of the encoder 31 and the output shaft sensor 16 is malfunctioning. A comparison between the motor angular position $\theta 1$, as measured by the encoder 31, and a target angular position thereof is also made during turning off of the motor 13 to determine whether they match with each other or not. If not, it may be determined that there is a possibility that the encoder 31 is malfunctioning or the motor 13 itself has undergone a mechanical lock, so that it is held from rotating.

The discrimination among the failures of the encoder 31 and the output shaft sensor 16 and another type of failure may be made by using a combination of the above decisions.

Specifically, if it is determined that the motor angular position θ1, as measured by the encoder 31, does not match the output shaft angular position θ2, as measured by the output shaft sensor 16, but the motor angular position θ1 matches the target angular position, it means that the encoder 31 is operating normally. The ECU 33, thus, determines that the output shaft sensor 16 has failed in operation.

If it is determined that the motor angular position θ1, as measured by the encoder 31, does not match the output shaft angular position θ2, as measured by the output shaft sensor 16, and the motor angular position θ1 does not also match the target angular position, the ECU 33 determines that the encoder 31 has failed in operation.

If it is determined that the motor angular position θ1, as measured by the encoder 31, matches the output shaft angular position θ2, as measured by the output shaft sensor 16, but the motor angular position θ1 does not match the target angular position, it means that the encoder 31 and the output shaft sensor 16 are both operating normally, but the motor 13 has failed to be driven correctly. It seems that the rotary system has undergone an excessive increase in rotational resistance therein or a mechanical lock. The ECU 33, thus, determines that another type of failure has occurred.

The above failure monitoring operation is implemented by executing the program of FIG. 3. The program is performed cyclically as long as an ignition switch of the automotive vehicle (i.e., the ECU 33) is in an on-state.

After entering the program, the routine proceeds to step 101 wherein it is determined whether the motor 13 is now at rest or not. If a NO answer is obtained, it is concluded that the motor 13 is now being actuated, so that the motor angular position θ1, as measured by the encoder 31, has not yet reached the target angular position. The routine, thus, terminates.

Alternatively, if a NO answer is obtained in step 101 meaning that the motor 13 is in the off-state, then the routine proceeds to step 102 wherein it is determined whether an absolute value of a difference between a value of θ1/Kg, as derived by converting the motor angular position θ1, as measured by the encoder 31, into an angular position of the output shaft 16 and the output shaft angular position θ2 is smaller than or equal to a permissible range or not which includes an error arising from the play of the torque transmission mechanism. Note that Kg is a gear ratio of the speed reducing mechanism 14. Alternatively, a change in the angular position of the output shaft 16 (i.e., θ1/Kg) may be compared with the output shaft angular position θ2 or a change in the output shaft angular position θ2.

In step 102, it may alternatively be determined whether an absolute value of a difference between a value of θ2·Kg, as derived by converting the output shaft angular position θ2, as measured by the output shaft sensor 16, into an angular position of the motor 13 and the motor angular position θ1 is smaller than or equal to the permissible range or not. Alternatively, a change in the angular position of the motor 13 (i.e., θ2·Kg) may be compared with the motor angular position θ1 or a change in the motor angular position θ1.

If a NO answer is obtained in step 102 (i.e., |θ1/Kg−θ2|≦permissible range) meaning that there is a possibility that the encoder 31 or the output shaft sensor 16 is failing in operation, then the routine proceeds to step 103 wherein it is determined whether the motor angular position θ1 is identical with the target angular position or not for determining which of the encoder 31 and the output shaft sensor 16 is now failing. If a NO answer is obtained meaning that the motor angular position θ1 is not identical with the target angular position, then the routine proceeds to step 105 wherein it is determined that the encoder 31 is failing, and a warning lamp (not shown) is turned on or blinked or warning information is indicated on a display installed on an instrument panel (not shown) to inform the vehicle operator of the failure of the encoder 31. The ECU 33 also stores the fact that the encoder 31 is malfunctioning in the SRAM 36 and switches the operation of the motor 13 from a feedback control mode to an open-loop control mode. The routine then terminates.

In the open-loop control mode of the motor 13, the ECU 33 outputs drive pulse signals to the motor drivers 34 and 35 to switch among the phases of the motor 13 to be energized in sequence, counts the drive pulse signals, and brings the angular position of the motor 13 into agreement with the target one based on the counted drive pulse signals without feeding data on the count value of the encoder 31 back to the ECU 33.

If a YES answer is obtained in step 103 meaning that the motor angular position θ1 is identical with the target angular position, and the encoder 31 is operating normally, then the routine proceeds to step 106 wherein it is determined that the output shaft sensor 16 is failing, and the warning lamp is turned on or blinked or warning information is indicated on the display installed on the instrument panel to inform the vehicle operator of the failure of the output shaft sensor 16. The ECU 33 also stores the fact that the output shaft sensor 16 is malfunctioning in the SRAM 36 and maintain the operation of the motor 13 in the feedback control mode. This is because the feedback control of the motor 13 may be performed regardless of the failure of the output shaft sensor 16. The routine then terminates.

If a YES answer is obtained in step 102 (i.e., |θ1/Kg−θ2|>permissible range| meaning that the encoder 31 and the output shaft sensor 16 both appear to be operating normally, then the routine proceeds to step 104 wherein it is determined whether the motor angular position θ1 is identical with the target angular position or not for determining whether the motor drive system is operating correctly or the another type of failure, for example, in operation of the rotary system caused by an excessive increase in rotational resistance therein or a mechanical lock. If a NO answer is obtained in step 104, then the routine proceeds to step 107 wherein the another type of failure has occurred, and the warning lamp is turned on or blinked or warning information is indicated on the display installed on the instrument panel of the vehicle to inform the vehicle operator of such a failure. The ECU 33 also stores such an event in the SRAM 36 and stops driving the motor 13. This is because it is impossible to drive the motor 13 in the open-loop control mode correctly if the rotary system has undergone the excessive increase in rotational resistance therein or the mechanical lock. The routine then terminates.

Alternatively, if a YES answer is obtained in step 104, then the routine proceeds to step 108 wherein the motor drive system is operating normally. The ECU 33 maintains the operation of the motor 13 in the feedback control mode. The routine then terminates.

If either of the encoder 31 and the output shaft sensor 16 has failed, the ECU 33 may initiate a fail-safe function to ensure gear changes of the automatic transmission 12 to a desired one of the P, R, N, and D ranges, thereby allowing the operator to drive the vehicle to, for example, a motor vehicle workshop.

The ECU 33 is, as described above, designed to compare the motor angular position $\theta_1$ (practically, $\theta_1/Kg$), as measured by the encoder 31, with the output shaft angular position $\theta_2$, as measured by the output shaft sensor 16, but may alternatively compare a change in motor angular position $\theta_1$ (practically, $\theta_1/Kg$) with the output shaft angular position $\theta_2$.

The output shaft sensor 16, as employed in the first embodiment, is of a type such as a potentionmeter which outputs the voltage signal varying in level linearly following rotation of the output shaft 15, but may be made up of a plurality of switches designed to produce patterns of on-and-off signals indicating angular positions of the output shaft 15 which match the P, R, N, and D positions of the gear shift lever (i.e., the P, R, N, and D ranges of the automatic transmission 12). An example of such a modification will be described below as the second embodiment with reference to FIGS. 4, 5, and 6. The second embodiment is identical in arrangements with the first embodiment except for as discussed below.

Figure 4:
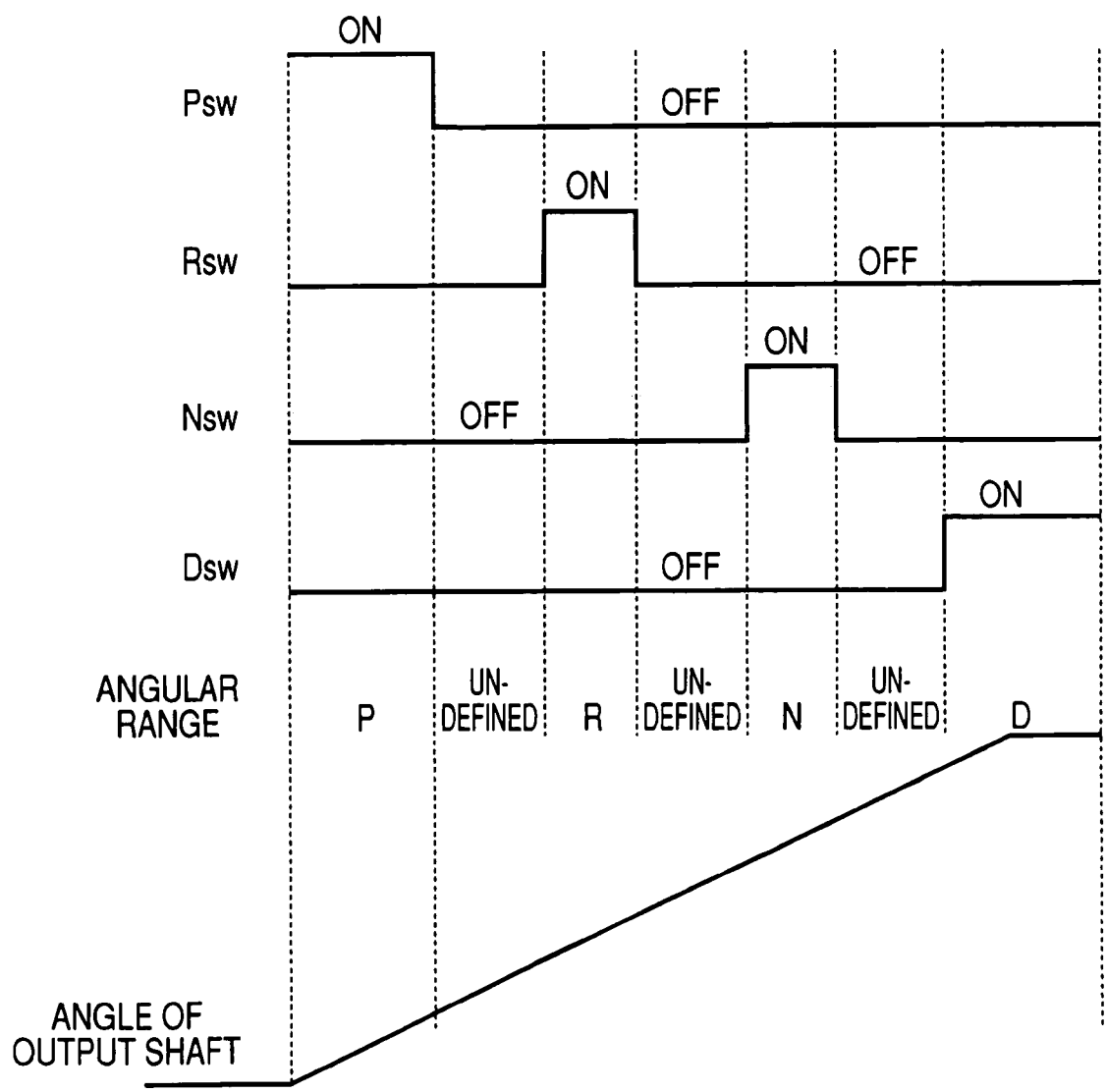
FIG. 4 is a view which shows relations between outputs of switches of an output shaft sensor and angular positions of the output shaft (i.e., gear ranges of automatic transmission) according to the second embodiment of the invention.
Figure 5:
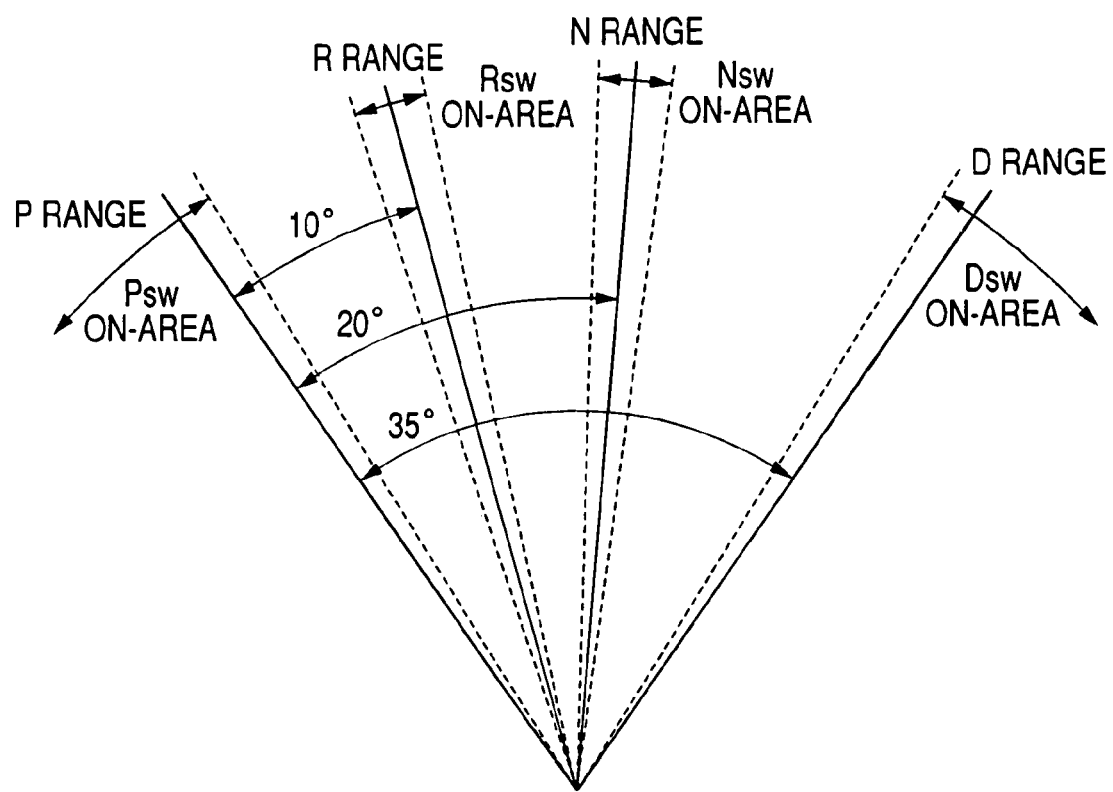
FIG. 5 is a schematic view which shows a structure of an output shaft sensor according to the second embodiment of the invention.

The output shaft sensor 16, as used in the second embodiment, consists, as shown in FIGS. 4 and 5, of four switches Psw, Rsw, Nsw, and Dsw each of which is turned on to produce an on-signal when the output shaft 15 falls, as can be seen in FIG. 5, in a corresponding one of four angular ranges P, R, N, and D matching the P, R, N, and D ranges of the automatic transmission 12. Specifically, the switches Psw, Rsw, Nsw, and Dsw work to produce patterns of combinations of on/off binary signals, as can be seen from FIG. 4, different among the angular ranges P, R, N, and D, thereby indicating in which of the four angular ranges P, R, N, and D the output shaft 15 is placed.

Figure 6:
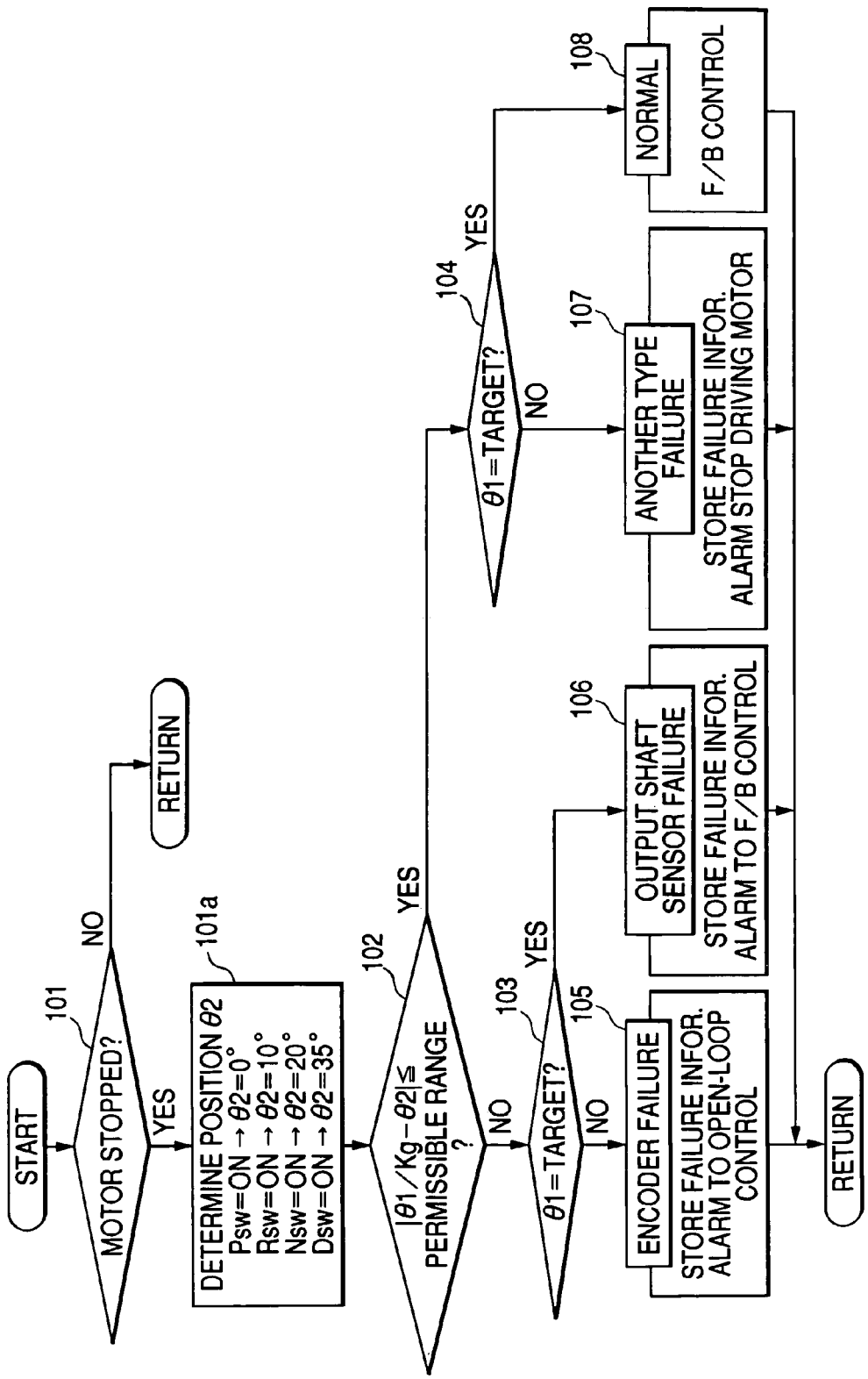
FIG. 6 is a flowchart of a program executed by an electronic control unit (ECU) of the motor drive control system failure monitoring system of FIG. 2 according to the second embodiment of the invention.

FIG. 6 shows a failure monitoring program, as executed in the ECU 33, which is different only in step 101a from the one in FIG. 3. Other steps are identical, and explanation thereof in detail will be omitted here.

The program is executed in a cycle during the on-state of the ignition switch of the vehicle (i.e., during the on-state of the ECU 33). After entering the program, the routine proceeds to step 101 whether it is determined whether the motor 13 is now at rest or not. If a NO answer is obtained, it is concluded that the motor 13 is now being actuated, so that the motor angular position $\theta_1$, as measured by the encoder 31, has not yet reached the target angular position. The routine, thus, terminates.

Alternatively, if a NO answer is obtained in step 101 meaning that the motor 13 is in the off-state, then the routine proceeds to step 101a wherein it is determined whether the ECU 33 samples the on/off binary signals produced by the switches Psw, Rsw, Nsw, and Dsw to determine the output shaft angular position $\theta_2$ (i.e., one of the angular ranges P, R, N, and D). For example, when the output of the switch Psw is the on-signal, the output shaft angular position $\theta_2$ is determined to be 0°. When the output of the switch Rsw is the on-signal, the output shaft angular position $\theta_2$ is determined to be 10°. When the output of the switch Nsw is the on-signal, the output shaft angular position $\theta_2$ is determined to be 20°. When the output of the switch Dsw is the on-signal, the output shaft angular position $\theta_2$ is determined to be 35°.

Subsequently, the routine then proceeds to step 102 wherein it is determined whether an absolute value of a difference between a value of $\theta_1/Kg$, as derived by converting the motor angular position $\theta_1$, as measured by the encoder 31, into an angular position of the output shaft 16 and the output shaft angular position $\theta_2$ is smaller than or equal to a permissible range or not. This determines, like the first embodiment, whether the encoder 31 and the output shaft sensor 16 are malfunctioning or not.

The ranges in which the switches Psw, Rsw, Nsw, and Dsw are, as described above in FIG. 5, turned on correspond to the angular ranges P, R, N, and D, respectively. Thus, the permissible range, as used in step 102, is set greater than the one in step 102 of FIG. 3 by an amount corresponding to the angular ranges P, R, N, and D. Operations subsequent to step 102 are the same as those in FIG. 3, and explanation thereof in detail will be omitted here.

The range shift mechanism 11, as used in the first and second embodiments, works to change the gear of the automatic transmission 12 from one to another of the P, R, N, and D ranges in response to a gear change request outputted from the ECU 33, but however, the invention may be employed with a range shift mechanism which is capable of changing the gear of the automatic transmission 12 additionally to a second-speed range or a low range or designed to switch the gear of the automatic transmission 12 only between two ranges: a parking range and a non-parking range.

The invention may alternatively be used with a variety of devices driven by a synchronous motor such as an SR motor.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A motor drive control system failure monitoring apparatus designed to monitor a failure in operation of a motor drive control system which controls rotation of a motor working to output torque to a motor-driven member through a torque transmitting mechanism and an output shaft joined to the motor-driven member and includes a motor angular position sensor working to produce an output as a function of an angular position of the motor for use in controlling rotation of the motor to bring the angular position of the motor into agreement with a target one and an output shaft angular position sensor working to produce an output as a function of an angular position of the output shaft, said failure monitoring apparatus comprising:

a first comparing circuit working to compare one of the output of the motor angular position sensor and a change in the output of the motor angular position sensor with one of the output of the output shaft angular position sensor and a change in the output of the output shaft angular position sensor;

a second comparing circuit working when the motor is at rest to compare the output of the motor angular position sensor with the target angular position when the motor is at rest; and a failure diagnosing circuit working to discriminate among failures in operation of the motor angular position sensor and the output shaft angular position sensor and another type of failure using results of the comparisons as made by said first and second comparing circuits;

wherein when the result of comparison made by said first comparing circuit shows that the one of the output of the motor angular position sensor and the change in the output of the motor angular position sensor mismatches the one of the output of the output shaft angular position sensor and the change in the output of the output shaft angular position sensor, said failure diagnosing circuit discriminates between the failures in operation of the motor angular position sensor and the output shaft angular position sensor based on whether the result of comparison made by the second comparing circuit shows a match between the output of the motor angular position sensor and the target angular position or not, and wherein when the result of comparison made by said first comparing circuit shows that the one of the output of the motor angular position sensor and the change in the output of the motor angular position sensor matches the one of the output of the output shaft angular position sensor and the change in the output of the output shaft angular position sensor, said failure diagnosing circuit discriminates between the failures in operation of the motor angular position sensor and the output shaft angular position sensor based on whether the result of comparison made by the second comparing circuit shows a mismatch between the output of the motor angular position sensor and the target angular position or not.

2. A motor drive control system failure monitoring apparatus as set forth in claim 1, wherein when it is determined that the output shaft angular position sensor is failing, said failure diagnosing circuit stores failure information indicating thereof in a storage device, performs a given warning operation, and controls the motor to bring the angular position thereof into agreement with the target one using the output of the motor angular position sensor in a feedback control mode, wherein when it is determined that the motor angular position sensor is failing, said failure diagnosing circuit stores failure information indicating thereof in the storage device, performs a given warning operation, and switches control of the motor from the feedback control mode to open-loop control mode, and wherein when it is determined that the another type of failure is occurring, said failure diagnosing circuit stores failure information indicating thereof in the storage device, performs a given warning operation, and stops driving the motor.

3. A motor drive control system failure monitoring apparatus designed to monitor a failure in operation of a motor drive control system which controls rotation of a motor working to output torque to a motor-driven member through a torque transmitting mechanism and an output shaft joined to the motor-driven member and includes a motor angular position sensor working to produce an output as a function of an angular position of the motor for use in controlling rotation of the motor to bring the angular position of the motor into agreement with a target one and an output shaft angular position sensor working to produce an output as a function of an angular position of the output shaft, said failure monitoring apparatus comprising:

a first comparing circuit working to compare one of the output of the motor angular position sensor and a change in the output of the motor angular position sensor with one of the output of the output shaft angular position sensor and a change in the output of the output shaft angular position sensor;

a second comparing circuit working when the motor is at rest to compare the output of the motor angular position sensor with the target angular position when the motor is at rest; and a failure diagnosing circuit working to discriminate among failures in operation of the motor angular position sensor and the output shaft angular position sensor and another type of failure using results of the comparisons as made by said first and second comparing circuits;

wherein when it is determined that the output shaft angular position sensor is failing, said failure diagnosing circuit stores failure information indicating thereof in a storage device, performs a given warning operation, and controls the motor to bring the angular position thereof into agreement with the target one using the output of the motor angular position sensor in a feedback control mode, wherein when it is determined that the motor angular position sensor is failing, said failure diagnosing circuit stores failure information indicating thereof in the storage device, performs a given warning operation, and switches control of the motor from the feedback control mode to open-loop control mode, and wherein when it is determined that the another type of failure is occurring, said failure diagnosing circuit stores failure information indicating thereof in the storage device, performs a given warning operation, and stops driving the motor.

4. A motor drive control system failure monitoring apparatus designed to monitor a failure in operation of a motor drive control system which controls rotation of a motor working to output torque to a motor-driven member through a torque transmitting mechanism and an output shaft joined to the motor-driven member and includes a motor angular position sensor working to produce an output as a function of an angular position of the motor for use in controlling rotation of the motor to bring the angular position of the motor into agreement with a target one and an output shaft angular position sensor working to produce an output as a function of an angular position of the output shaft, said failure monitoring apparatus comprising:

a first comparing circuit working to compare one of the output of the motor angular position sensor and a change in the output of the motor angular position sensor with one of the output of the output shaft angular position sensor and a change in the output of the output shaft angular position sensor;

a second comparing circuit working when the motor is at rest to compare the output of the motor angular position sensor with the target angular position when the motor is at rest; and a failure diagnosing circuit working to discriminate among failures in operation of the motor angular position sensor and the output shaft angular position sensor and another type of failure using results of the comparisons as made by said first and second comparing circuits;

wherein the motor-driven member is a range shift mechanism working to shift one of gear ranges of an automotive automatic transmission to a selected one.

5. A method of monitoring and diagnosing failure modes of a motor drive control system which controls rotation of a motor working to output torque to a motor-driven member through a torque transmitting mechanism and an output shaft joined to the motor-driven member and includes (a) a motor angular position sensor and (b) an output shaft angular position sensor said method comprising:
(i) comparing an output of the motor angular position sensor with an output of the output shaft angular position sensor,
(ii) comparing the output of the motor angular position sensor with a target angular position taken when the motor is at rest, and
(iii) discriminating among possible failure modes in operation of the motor angular position sensor and the output shaft angular position sensor and another type of failure using results of said comparisons;
wherein when the result of step (i) shows that an output of the motor angular position sensor mismatches an output of the output shaft angular position sensor step (iii) discriminates between failures in operation of the motor angular position sensor and the output shaft angular position sensor based on whether the result of step (ii) shows a match between the output of the motor angular position sensor and a target angular position or not, and
when the result of step (i) shows that an output of the motor angular position sensor matches an output of the output shaft angular position sensor step (iii) discriminates between failures in operation of the motor angular position sensor and the output shaft angular position sensor based on whether the result of step (ii) shows a mismatch between the output of the motor angular position sensor and a target angular position or not.

6. A method as in claim 5 wherein:
when it is determined that the output shaft angular position sensor is failing, failure information to that effect is stored, a warning signal is generated and the motor to controlled to bring its angular position into agreement with a target position using an output of the motor angular position sensor in a feedback control mode,
when it is determined that the motor angular position sensor is failing, failure information to that effect is stored, a warning signal is generated and control of the motor is switched from a feedback control mode to an open-loop control mode, and
when it is determined that another type of failure is occurring, failure information to that effect is stored, warning signal generated and the motor is stopped.

7. A method of monitoring and diagnosing failure modes of a motor drive control system which controls rotation of a motor working to output torque to a motor-driven member through a torque transmitting mechanism and an output shaft joined to the motor-driven member and includes (a) a motor angular position sensor and (b) an output shaft angular position sensor said method comprising:
(i) comparing an output of the motor angular position sensor with an output of the output shaft angular position sensor,
(ii) comparing the output of the motor angular position sensor with a target angular position when the motor is at rest, and
(iii) discriminating among possible failure modes in operation of the motor angular position sensor and the output shaft angular position sensor and another type of failure using results of said comparisons;
wherein when it is determined that the output shaft angular position sensor is failing, failure information to that effect is stored warning signal is generated and the motor is controlled to bring its angular position into agreement with a target position using the output of the motor angular position sensor in a feedback control mode,
when it is determined that the motor angular position sensor is failing, failure information to that effect is stored, warning signal is generated and control of the motor is switched from a feedback control mode to open-loop control mode, and
when it is determined that another type of failure is occurring, failure information to that effect is stored, a warning signal is generated and the motor is stopped.

8. A method of monitoring and diagnosing failure modes of a motor drive control system which controls rotation of a motor working to output torque to a motor-driven member through a torque transmitting mechanism and an output shaft joined to the motor-driven member and includes (a) a motor angular position sensor and (b) an output shaft angular position sensor said method comprising:
(i) comparing an output of the motor angular position sensor with an output of the output shaft angular position sensor.
(ii) comparing the output of the motor angular position sensor with a target angular position when the motor is at rest, and
(iii) discriminating among possible failure modes in operation of the motor angular position sensor and the output shaft angular position sensor and another type of failure using results of said comparisons;
wherein the motor-driven member is a range shift mechanism working to shift one of gear ranges of an automotive transmission to a selected one.

* * * * *